(12) United States Patent
Chakraborty

(10) Patent No.: US 7,248,737 B2
(45) Date of Patent: Jul. 24, 2007

(54) PAGE DECOMPOSITION USING LOCAL ORTHOGONAL TRANSFORMS AND A MAP OPTIMIZATION

(75) Inventor: Amit Chakraborty, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 655 days.

(21) Appl. No.: 10/261,296

(22) Filed: Sep. 30, 2002

(65) Prior Publication Data

US 2003/0088825 A1 May 8, 2003

Related U.S. Application Data

(60) Provisional application No. 60/326,652, filed on Oct. 2, 2001.

(51) Int. Cl.
*G06K 9/34* (2006.01)
*G06K 9/68* (2006.01)
*H04N 1/40* (2006.01)

(52) U.S. Cl. .................. 382/176; 382/226; 358/462
(58) Field of Classification Search ............. 382/268, 382/224–228, 250, 173–180, 176
See application file for complete search history.

(56) References Cited

U.S. PATENT DOCUMENTS 4,741,046 A * 4/1988 Matsunawa et al. ........ 382/176
5,661,820 A * 8/1997 Kegelmeyer, Jr. .......... 382/226
6,175,592 B1 * 1/2001 Kim et al. ............. 375/240.16
6,307,952 B1 * 10/2001 Dietz ........................ 382/170
7,068,398 B2 * 6/2006 Rijavec ................. 358/426.01
2002/0076049 A1 * 6/2002 Boykin et al. ............. 380/211
2003/0088825 A1 * 5/2003 Chakraborty ............... 715/500

OTHER PUBLICATIONS

Jia Li, Text and Picture Segmentation by the Distribution Analysis of Wavelet Coefficients, IEEE 1998, pp. 790-794.*
Multiscale segmentation of unstructured document pages using soft decision integration; Etemad, K.; Doermann, D.; Chellappa, R.;Pattern Analysis and Machine Intelligence, IEEE Transactions on vol. 19, Issue 1, Jan. 1997 pp. 92-96.*

* cited by examiner

*Primary Examiner*—Joseph Mancuso
*Assistant Examiner*—Hadi Akhavannik
(74) *Attorney, Agent, or Firm*—Donald B. Paschburg; F. Chau & Associates, LLC

(57) ABSTRACT

Document processing and understanding can be important for a variety of applications such as office automation, creation of electronic manuals, online documentation and annotation, etc. The first step towards this process can involve the decomposition of a page into separate units describing the text, graphics, pictures etc. Towards that end, a method of page decomposition comprises segmenting an image into a plurality of blocks according to an amount of information contained in each block, classifying each block according to a corresponding frequency spectrum, and refining a classification of each block.

16 Claims, 4 Drawing Sheets

PAGE DECOMPOSITION USING LOCAL ORTHOGONAL TRANSFORMS AND A MAP OPTIMIZATION

CROSS REFERENCE TO RELATED APPLICATION

The present application claims priority to U.S. Provisional Patent Application Ser. No. 60/326,652, filed Oct. 2, 2001, which is hereby incorporated by reference.

BACKGROUND OF THE INVENTION

1. Field of the Invention

The present invention relates to page decomposition and more particularly to a method of page decomposition using local orthogonal transforms and a map optimization.

2. Discussion of Related Art

Despite the emergence of electronic documents there has not been a significant decrease in the use of paper based documents. In fact, The use of paper documents may have increased due to a preference for paper documents for reading and archiving purposes. Similarly, newspapers continue to be popular even after the introduction of the radio, TV and World Wide Web. However, storing and analyzing paper documents and more importantly, retrieving them can be a cumbersome task. Electronic documents however, have the advantage that they can be manipulated and analyzed easily. Consequently, transformation of a paper document to an electronic form has become an important task.

The understanding and transformation of paper documents is nontrivial. It has been observed that the development of a general system that can process all kinds of documents such as technical reports, engineering drawings, books, journals, newspapers etc. can be far more complex. For coding and understanding a range of documents, an application needs to identify text, image and graphics regions as physical segments of the page to be able to process them properly.

The majority of page segmentation works are, to an extent, dependent on page layout and can be classified as either bottom-up or top-down. Bottom-up approaches often use connected component grouping where one starts from the pixel level and, in an hierarchical fashion, combines pixels into larger and larger entities such as characters, lines, text, graphics etc. In the top-down strategy, an image is broken into blocks that can be identified and further subdivided appropriately. There are also hybrid methods that combine the top-down and the bottom-up approaches. In other approaches, after detecting major blocks, simple statistical tests classify them as either text or non-text regions. Black pixel density, black/white ratio, transitions, average vertical or horizontal run-lengths are some of the features that these methods take into account during post classification stages. Yet another method analyses the background white space. In this scheme, major white spaces between printed components are tracked to identify boundaries. This method is based on a few assumptions and provides good results even for skewed images or documents with complex layouts. However, it can only be applied for images that are clean and where there is no overlap between regions.

In contrast to the geometric layout analysis, the logical layout analysis has not received as much attention. Some logical analysis performs region identification or classification in a derived geometric layout. These approaches are however, primarily rule based and thus the final outcome depends on the dependability of the prior information and how well that is represented within the rules.

Therefore, a need exists for a method of page decomposition using local orthogonal transforms and a map optimization.

SUMMARY OF THE INVENTION

A geometric page layout of a document is a specification of the geometry of the maximal homogeneous regions and their classification (text, table, image, drawing etc.). Logical page layout analysis comprises determining the type of page, assigning functional labels such as title, note, footnote, caption etc. to each block of the page, determining the relationships of these blocks and ordering the text blocks according to their reading order. The performance of a document understanding system as a whole depends significantly on the preprocessing that goes in before optical character recognition (OCR), for example, page segmentation.

According to an embodiment of the present invention, a system processes geometric layout analysis of a document page, segmenting the page into text, graphics and images. This encompasses the domain of document images such as engineering drawings and technical journals. Some of the issues that complicate the process of page decomposition are noise and degradation due to copying or scanning, transmission or aging, page skew and text with different orientations, overlapping and irregular regions, and misalignment due to scanning problems. According to an embodiment of the present invention, a method can segment the image without making pixel to pixel comparisons. Towards that end, the image can be broken into adaptive blocks depending upon the amount of information present in each block (entropy) using a wavelet packet approach. The frequency content can be analyzed to make a determination as to whether a block is text, graphics or imagery. A Markov Random Field prior can be used to emphasize smoothness while determining a refined classification within a Bayesian framework.

According to an embodiment of the present invention, a method of page decomposition comprises segmenting an image into a plurality of blocks according to an amount of information contained in each block, classifying each block according to a corresponding frequency spectrum, and refining a classification of each block.

Segmenting an image further comprises dividing, iteratively, the plurality of blocks into a plurality of child blocks, wherein each of the plurality of blocks has a set of corresponding child blocks, determining an entropy for each of the plurality of blocks and the set of corresponding child blocks, and performing a further iteration upon determining the entropy of each of the plurality of blocks is greater than the entropy of the set of corresponding child blocks. The method folds each block along at least one edge, wherein each block comprises a plurality of edges, and determines a discrete cosine transform of each block prior to determining the entropy of the block.

Classifying each block further comprises determining, for each block a plurality of probabilities according to the frequency spectrum of each block, wherein each probability corresponds to a content type, determining for each block a maximum a posteriori probability, and classifying each block within a Bayesian framework comprising block values and neighborhood values. The frequency spectrum of each block is classified according to a concentration of frequency content and variance of the frequency spectrum.

An initial segmentation of the image is performed according to a predefined block size. The predefined block size is 256 pixels by 256 pixels.

According to an embodiment of the present invention, a program storage device is provided, readable by machine, tangibly embodying a program of instructions executable by the machine to perform method steps for page decomposition.

According to an embodiment of the present invention, a system adapted to decompose a page comprises a segmenting module for excepting an image, and dividing the image into a plurality of blocks according to an entropy of each block. The system further comprises a classifying module coupled to the segmenting module for excepting the plurality of blocks, wherein each block is classified according to a concentration component and a variance component of the frequency spectrum, and wherein a resulting classified image comprising a plurality of classified blocks is output.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
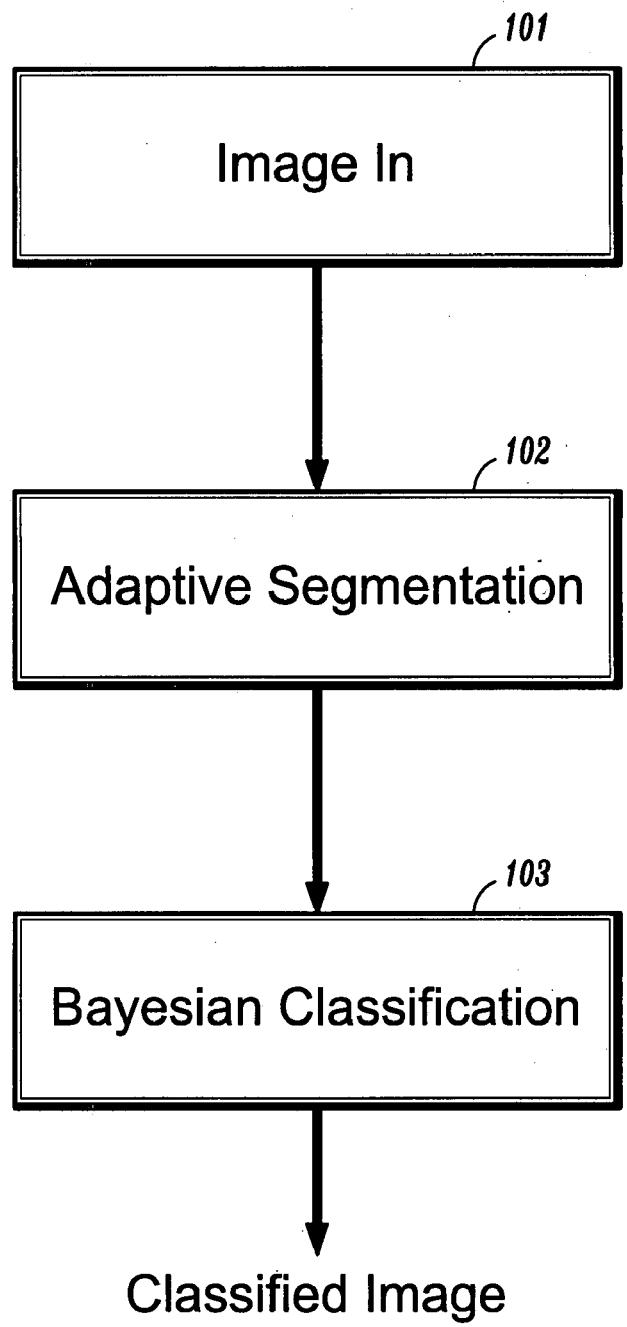
FIG. 1 is an overview of a method according to an embodiment of the present invention.

Referring to FIG. 1, the input to the system is the scanned image 101. An adaptive block representation of the image can be created 102. This can be achieved by using an Lapped Orthogonal Transform, e.g., a Cosine based Lapped Orthogonal Transform. A frequency analysis can be done for each of the blocks to make a determination as to whether the blocks are text, image or graphics. The classification can also include a measure of neighborhood. The neighborhood measure can be introduced into the classification through a Markov Random Field prior and a refined classification can be achieved by maximizing the aposteriori probability 103.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
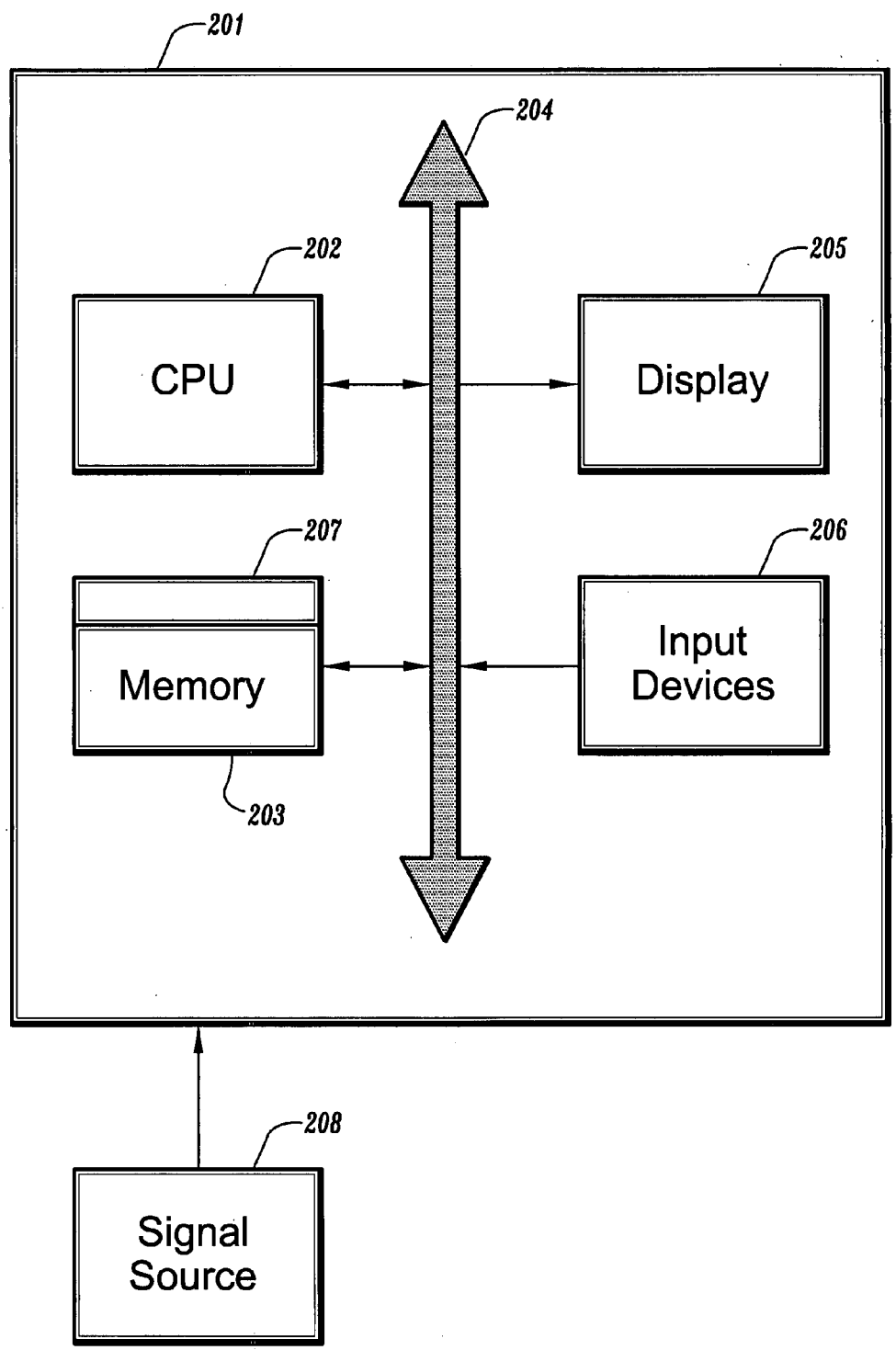
FIG. 2 is a diagram of a computer system according to an embodiment of the present invention.

Referring to FIG. 2, according to an embodiment of the present invention, a computer system 201 for implementing the present invention can comprise, inter alia, a central processing unit (CPU) 202, a memory 203 and an input/output (I/O) interface 104. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 103 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
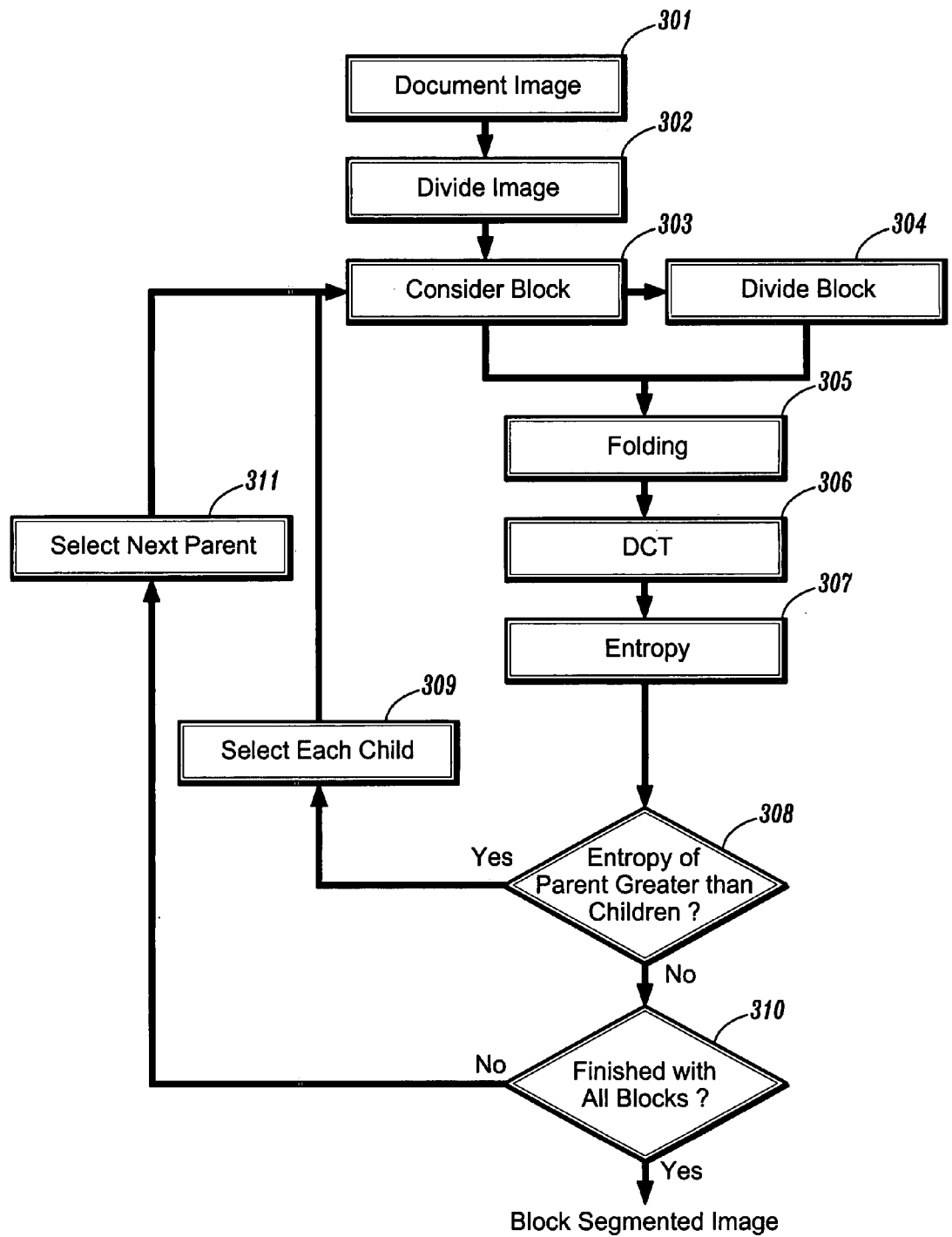
FIG. 3 is a flow chart of a segmentation method according to an embodiment of the present invention.

Referring to FIG. 3, given a document image 301, the image can be adaptively divided into a block representation. The block size can depend upon the amount of information content in a given location of the image. If the information content is high, i.e., the entropy is high, the block size can be reduced. Thus, flat regions of the image are not subdivided where areas with dense patterns are broken up into several blocks. To achieve this a local cosine transform can be used. The coefficients of the transform can be used to measure the information content. This segmentation can be achieved in a top-down manner. Starting with the whole image as the root block and then segmenting down to a quad-block at each iteration based on the information content in view of the size of these images. Assuming, for example, a block size, of 256 pixels, the image is first broken up into 256×256 blocks 302, ignoring the effect of the margins, which can be of a size less than or equal to 256, for a smaller image, a smaller starting block, for example, of 128×128, can be used.

For each block 303, before taking the local cosine transform, a periodized folding can be performed 305. When a block is taken from an image or a signal and converted to a frequency domain, the abrupt cutoff at the edges results in a distortion in the frequency domain, which can result in error. This is particularly true if, at the edge of the block, there are sharp discontinuities introduced. Folding allows for the creation of a smooth termination at the edges by proper windowing. Also, folding helps to avoid the Balian-Low bound. The periodization is given as follows in one dimension. For 2D, the folding can be performed in the two directions, e.g., one after the other.

$$Wf(t) = W(r, I, \epsilon)f(t) \quad (1)$$

$$= r\left(\frac{t - \alpha_0}{\epsilon}\right)f(t) + r\left(\frac{\alpha_0 - t}{\epsilon}\right)f(\alpha_0 + \alpha_1 - t)\alpha_0 < t \leq \alpha_0 + \epsilon \quad (2)$$

$$= \bar{r}\left(\frac{\alpha_1 - t}{\epsilon}\right)f(t) - \bar{r}\left(\frac{t - \alpha_1}{\epsilon}\right)f(\alpha_0 + \alpha_1 - t)\alpha_1 - \epsilon < t \leq \alpha_1 \quad (3)$$

where f(t) is the function that is being folded, and I=(ao, a1) is the interval for the function, i.e., the block interval, (−E, E) is the small subinterval (often less than 10 and r(t) ($\bar{r}(t)$ being the conjugate) is the rising cutoff function. The rising cutoff function can be written as:

$$r(t) = 0 \; t \leq -1 \quad (4)$$

$$= \sin(\pi(1+t)/4) \; -1 < t < 1 \quad (5)$$

$$= 1 \; t < 1 \quad (6)$$

The rising cutoff function can be scaled to translate the interval (−1,1) to (∈,−∈).

The discrete cosine transform (DCT) for each block can be determined 306 using the basis:

$$C(m,n) = \sqrt{\left(\frac{2}{N}\right)\cos\left(\frac{\pi(n+0.5)(m_-+0.5)}{N}\right)} \quad (7)$$

where N is the block size. The discrete cosine transform separates the block into parts, i.e., spectral sub-bands, of differing importance with respect to the block's visual quality. The discrete cosine transform is similar to a discrete Fourier transform: it transforms a signal or image from the spatial domain to the frequency domain.

Based on the discrete cosine transform of a given block, the logarithm of the energy can be determined 307 as:

$$M(m,n) = \sum_{m,n} \log(C(m,n)^2) \quad (8)$$

The folding, Discrete Cosine Transform and the logarithm of the energy are performed or determined for each block. Each of these blocks can be further divided into sub-blocks 304, for example, four sub-blocks or children for each parent block. Let Mb be the measure for the parent block and Mb1 to Mb4 be the ones for the four sub-blocks. The entropy of a parent block is compared to the total entropy of its children 308. Then if $$M_b < M_{b1} + M_{b2} + M_{b3} + M_{b4} \quad (9)$$

the sub-blocks will not be subdivide any further. This process is then iterated for the sub-blocks 309. Further, the iteration covers all blocks at the same level as the parent 210 and 211. Thus, after the subdivision is complete, the entropy is minimized.

This, the document which has been divided into blocks can be classified into a number of regions or classes, e.g., text, photos or graphics. Thus, each block in the document image needs to be classified.

Let S denote the document image lattice, e.g., S={1<s ≤M}, where M is the total number of blocks represent the document image. Let {$L_s$, s ∈ S} and {$Y_s$, s ∈ S} denote the labels and the document image respectively. Note that the labels can belong to only a certain number of region classes. This number is pre-specified. Let $N_s$ denote the neighborhood of a site s (a first order neighborhood comprises four neighbors, eight in the case of a second order system and so on).

Figure 4:
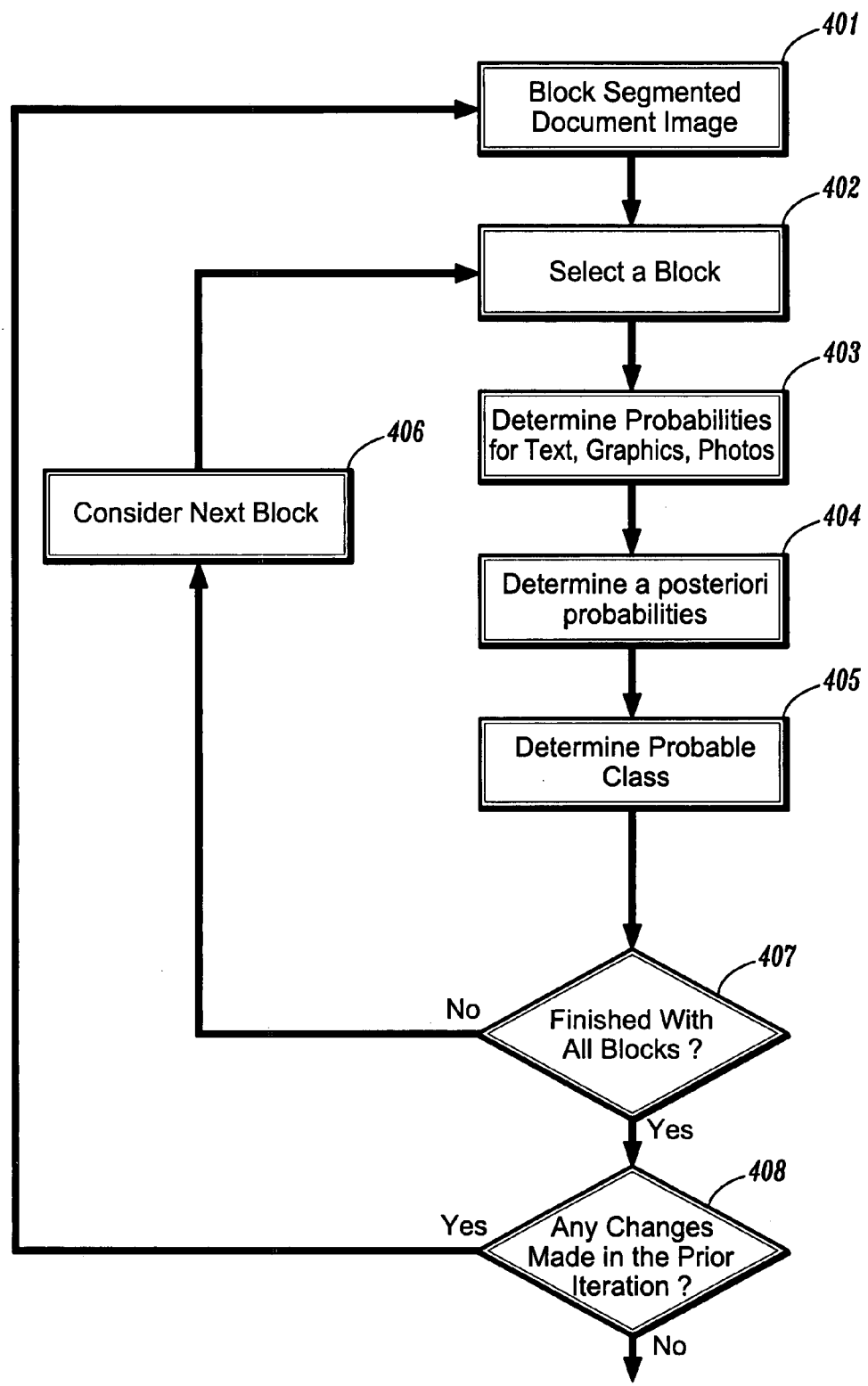
FIG. 4 is a flow chart of a Bayesian classification according to an embodiment of the present invention.

Referring to FIG. 4, previously, the document image was divided into a set of blocks 401. Also, since the LCTs were computed, the frequency spectrum is available for each of these blocks. Therefore, for a given block 402, a probability of text, graphics or photo can be determined 403 based on the frequency spectrum. If a block belongs to a photo, since most pictures have smoothly varying grey level values that dominate the image, it is likely that a significant amount of the energy will be concentrated within the lower half of the spectrum. Let $f_{max}$ be the maximum frequency content of the spectrum (this is fixed and is determined by the sampling rate). Let $e_l$ be the energy of the spectrum that is confined to the lower half of the spectrum, i.e., for all frequencies, f<$f_{max}$/2 and $e_h$ be that in the other half. If the block belongs to either text or graphics the energy will be concentrated at higher frequencies (than expected for an image). In addition, text typically appears in a very regular fashion, text can be recognized by the regular manner in which the letters are arranged, whereas for many graphics there is no such regularity. Further, regularity in the space domain means that the frequency domain is more compact. If the variance of for the spectrum is determined, it is likely that the text regions will have a smaller variance than the graphics region.

Now, assuming that all the nearest neighbors of s also have the same label as s, based on the above observation, the following expression for the conditional density of the intensity at the pixel site s (i.e., the a posteriori probabilities) can be determined 404. These probabilities can be written as:

$$P(Y_s = y_s | Y_r = y_r, r \in N_s, L_s = \text{photo}) = \frac{e_l}{e_l + e_h} \quad (10)$$

and $$P(Y_s = y_s | Y_r = y_r, r \in N_s, L_s = \text{text}) = \frac{e_h}{e_l + e_h} \frac{\sigma}{f_{max}} \quad (11)$$

and $$P(Y_s = y_s | Y_r = y_r, r \in N_s, L_s = \text{graphics}) = \frac{e_h}{e_l + e_h} \frac{f_{max} - \sigma}{f_{max}} \quad (12)$$

The three probabilities, which define the distribution, add up to 1.0. Additional probabilities can be added for other content types.

Once the blocks has been modeled, the classification can be defined 405. This is achieved by maximizing the posterior (the maximum a posteriori (MAP) method). The posterior probability comes from Bayesian approaches, i.e., the probability of L being the object given the measurement Y. (See (13).) The distribution of the region labels given the block representation for the block image can be written as:

$$P(L | Y^*) = \frac{P(Y^* | L) P(L)}{P(Y^*)} \quad (13)$$

where L corresponds to the classified image with $L_s$ describing the label at the $s^{th}$ block. The label field L is modeled as a first or second order Markov random field, which says that $P(L_s|L_{S/s})=P(L_s|L_r, r \in N_s)$ where $L_{S/s}$ is the whole label field excluding the site s, and $N_s$ denotes the neighborhood of site s. It acts as a prior that emphasizes the property that neighboring blocks of the classified image share the same label. Maximizing (13) gives an optimal Bayesian estimate.

A coordinate-wise descent method, similar to the iterated conditional mode (ICM) method, can be implemented. Here, according to an embodiment of the present invention, starting with an initial labeling, $L^0$, a method can iterate sequentially (or in parallel) through each pixel, replacing the current label at that pixel with the label that maximizes $P(L_s|Y^*, L_{S/s})$, where $L_{S/s}$ represents the label set for the whole image except the site s, and the other symbols have the same connotations as before. This is equivalent to maximizing $\forall s \in S$ $$\operatorname*{argmax}_{L_s} P(L_s \mid Y^*, L_{S/s}) = P(L_s \mid Y^*, L_r, r \in \hat{N}_s) \quad (14)$$

which can be reduced to determining $$L_s^* = \operatorname*{argmax}_{L_s} P(y_s^* \mid Y_{S/s}^*, L_s, L_r, r \in \hat{N}_s) P(L_s \mid L_r, r \in \hat{N}_s) \quad (15)$$

for each of the sties s, using the ICM algorithm.

The function in (15) is optimized at each step where the first term, the conditional probability term is given by (10, 11, 12) and the second term is the prior term given by the Markov random fields assumption. Thus, at each iteration, each pixel is updated to maximize (15) using the data at site s and the neighborhood, and the current estimate of the labels of the neighborhood. Each block is considered 406 until all blocks have been considered 407, and the iterations continue so long as the number of changes is above a certain fraction of the image size 408.

Having described embodiments for a method of page decomposition using local orthogonal transforms and a map optimization, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method of page decomposition comprising the steps of:
    segmenting an image into a plurality of blocks according to an amount of information contained in each block, wherein the segmenting comprises;
        dividing, iteratively, the plurality of blocks into a plurality of child blocks, wherein each of the plurality of blocks has a set of corresponding child blocks;
        determining an entropy for each of the plurality of blocks and the set of corresponding child blocks; and
        performing a further iteration of the dividing on at least one of the plurality of blocks upon determining the entropy of the at least one of the plurality of blocks is greater than the entropy of the set of corresponding child blocks;
    classifying each block as one of a text, an image and a graphics block according to a corresponding frequency spectrum and a corresponding value of a neighborhood; and
    refining a classification of each block by iterating the classifying of each block.

2. The method of claim 1, further comprising the steps of:
    folding each block along at least one edge, wherein each block comprises a plurality of edges, wherein folding further comprises applying a rising cutoff function to each folded block; and
    determining a discrete cosine transform of each block prior to determining the entropy of the block.

3. The method of claim 1, wherein the step of classifying each block further comprises the steps of:
    determining, for each block a plurality of probabilities according to the frequency spectrum of each block, wherein each probability corresponds to a content type;
    determining for each block a maximum a posteriori probability; and
    classifying each block within a Bayesian-framework comprising block values and neighborhood values.

4. The method of claim 3, wherein the frequency spectrum of each block is classified according to a concentration of frequency content and variance of the frequency spectrum.

5. The method of claim 1, wherein an initial segmentation of the image is performed according to a predefined block size.

6. The method of claim 5, wherein the predefined block size is 256 pixels by 256 pixels.

7. A program storage device readable by machine, tangibly embodying a program of instructions executable by the machine to perform method steps for page decomposition, the method steps comprising:
    segmenting an image into a plurality of blocks according to an amount of information contained in each block, wherein the segmenting comprises;
        dividing, iteratively, the plurality of blocks into a plurality of child blocks, wherein each of the plurality of blocks has a set of corresponding child blocks;
        determining an entropy for each of the plurality of blocks and the set of corresponding child blocks; and
        performing a father iteration of the dividing on at least one of the plurality of blocks upon determined the entropy of the at least one of the plurality of blocks is greater than the entropy of the set of corresponding child blocks;
    classifying each block as one of a text, an image and a graphics block according to a corresponding frequency spectrum; and
    refining a classification of each block.

8. The method of claim 7, further comprising the steps of:
    folding each block along at least one edge, wherein each block comprises a plurality of edges, wherein folding further comprises applying a rising cutoff function to each folded block; and
    determining a discrete cosine transform of each block prior to determining the entropy of the block.

9. The method of claim 7, wherein the step of classifying each block further comprises the steps of:
    determining, for each block a plurality of probabilities according to the frequency spectrum of each block, wherein each probability corresponds to a content type;
    determining for each block a maximum a posteriori probability; and
    classifying each block within a Bayesian-framework comprising block values and neighborhood values.

10. The method of claim 9, wherein the frequency spectrum of each block is classified according to a concentration of frequency content and variance of the frequency spectrum.

11. The method of claim 7, wherein an initial segmentation of the image is performed according to a predefined block size.

12. The method of claim 11, wherein the predefined block size is 256 pixels by 256 pixels.

13. A system adapted to decompose a page comprising:
a segmenting module for excepting an image, and dividing the image into a plurality of blocks according to an entropy of each block, wherein the segmenting module divides, iteratively, the plurality of blocks into a plurality of child blocks, wherein each of the plurality of blocks has a set of corresponding child blocks, determines an entropy for each of the plurality of blocks and the set of corresponding child blocks, and performs a further iteration of the dividing on at least one of the plurality of blocks upon determining the entropy of the at least one of the plurality of blocks is greater than the entropy of the set of corresponding child blocks; and
a classifying module coupled to the segmenting module for excepting the plurality of blocks, wherein each block is classified as one of a text, an image and a graphics block according to a concentration component, a variance component of the frequency spectrum, and a neighborhood value, and wherein the classifying module iterates through the plurality of blocks and determines a percentage of classification changes of the plurality of blocks from a prior iteration to a threshold, and upon determining the percentage to be at or below the threshold outputting a resulting classified image comprising a plurality of classified blocks.

14. The method of claim 4, wherein the classifying of each block is performed according to the corresponding frequency spectrum and a corresponding value of a neighborhood, and the refining of the classification of each block is performed by iterating the classifying of each block.

15. The method of claim 14, further comprising comparing, at each iteration, a percentage of classification changes from a prior iteration to a threshold, and upon determining the percentage to be at or below the threshold, outputting a classified image.

16. The method of claim 1, further comprising comparing, at each iteration, a percentage of classification changes from a prior iteration to a threshold, and upon determining the percentage to be at or below the threshold, outputting a classified image.

* * * * *